Oct. 26, 1926.                                            1,604,248
                       C. C. VAN NUYS
     APPARATUS FOR THE LIQUEFACTION AND SEPARATION OF THE
              CONSTITUENTS OF GASEOUS MIXTURES
                   Original Filed Sept. 9, 1920
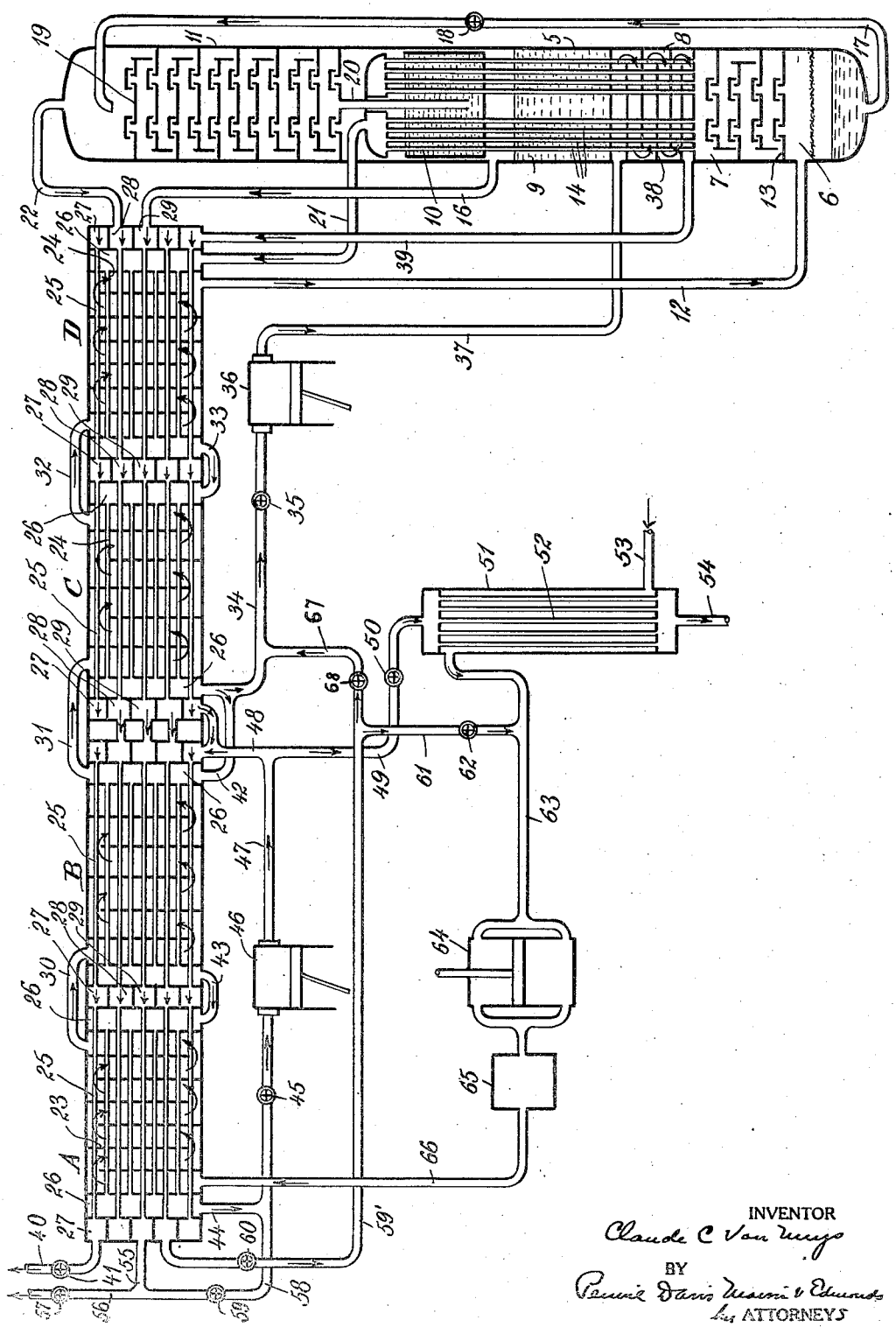
INVENTOR
Claude C Van Nuys
BY
Pennie Davis Marvin & Edmunds
his ATTORNEYS Patented Oct. 26, 1926.

1,604,248

UNITED STATES PATENT OFFICE.

CLAUDE C. VAN NUYS, OF CRANFORD, NEW JERSEY, ASSIGNOR TO AIR REDUCTION COMPANY, INCORPORATED, OF NEW YORK, N. Y., A CORPORATION OF NEW YORK.

APPARATUS FOR THE LIQUEFACTION AND SEPARATION OF THE CONSTITUENTS OF GASEOUS MIXTURES.

Original application filed September 9, 1920, Serial No. 409,197. Divided and this application filed December 6, 1924. Serial No. 754,280.

This invention relates to the liquefaction of gases for the purpose of separating the constituents thereof by rectification.

This application is a division of application Serial No. 409,197, filed Sept. 9, 1920, now Patent No. 1,548,060, granted Aug. 11, 1925.

In liquefaction methods as heretofore known, the operation of partial liquefaction and auto-purification by a backward return of the liquid in contact with the gas has been advantageously employed to produce a liquid enriched in a less volatile constituent of the mixture, which liquid is subsequently subjected to rectification to separate the more volatile constituent. In such a method, the liquid originally formed should have a composition approximately in phase equilibrium with the gaseous mixture which is to be treated. It has been found, however, that a simple liquefaction with backward return does not permit of sufficient separation of the gaseous constituents to insure a liquid having the composition desired to attain the highest efficiency. Thus, in the separation of oxygen from nitrogen in the atmosphere, the liquid formed should contain approximately 47% oxygen, but it has been impossible heretofore to produce such a liquid, because as has been discovered, the volume of liquid returning and particularly at the lower ends of the condensing tubes is such and its rate of travel is so high that no opportunity is afforded for the desired separation. In a well-known method employing this principle of condensation with "backward return", there is, in addition to the difficulty just mentioned, the further disadvantage that the enrichment in the less volatile constituent obtained by "backward return" is reduced by the addition to the liquid delivered by the "backward return" condenser of a certain amount of unenriched liquid air in order to make up losses of liquid due to heat leakage. Since the liquid is delivered to a rectifier in which the final separation of the constituents is accomplished and governs more or less the composition of the effluent gas, it will be appreciated that the provision of an initial liquid of the desired composition is of the highest importance in the successful and efficient recovery of constituents of gaseous mixtures.

The object of the present invention is, therefore, to provide an apparatus for separating the constituents of gaseous mixtures in which an initial liquid is produced having substantially the theoretically possible composition of the liquid in phase equilibrium with the incoming air.

Further objects and advantages of the invention will be apparent as it is better understood by reference to the following specification when read in connection with the accompanying drawing which diagrammatically illustrates an apparatus adapted to the accomplishment of the desired object.

It is to be understood that while the apparatus illustrated is that preferably employed in carrying out the invention, various modifications may be introduced and no attempt has been made to illustrate details which may be readily supplied by those skilled in the art. Furthermore, while the invention will be described more particularly with reference to the separation of oxygen and nitrogen from air, the apparatus is applicable to the treatment of gaseous mixtures in general and no limitation is implied, therefore, by reference to the atmosphere and the constituents thereof. In describing the apparatus the atmosphere will be considered as comprising oxygen and nitrogen, thereby disregarding the rare elements present, since these elements do not materially affect the operation so far as the production of commercial gases is concerned.

In carrying out the invention, air is delivered, after it has been compressed and cooled in the usual manner, to an apparatus in which it is subjected to indirect contact with colder liquid and gaseous products, the liquids being held at somewhat lower pressures so that they are permitted to evaporate through transfer of heat from the incoming air. A portion of the air is thus liquefied and this portion consisting of substantially all of the oxygen with some of the nitrogen flows backwardly within tubes provided in the apparatus, as hereinafter described, in contact with further portions of the air ascending in the tubes, and tends during its backward passage to become enriched in oxygen while a portion of the nitrogen is taken up and carried away with the residual unliquefied portion of the air. This residual gas is substantially pure nitrogen and in the preferred embodiment of my invention the nitrogen is withdrawn and may be applied to any desired purpose after its cold has been transferred to incoming air. The nitrogen, being delivered at the initial pressure of the air, may, after it is warmed, be expanded in a suitable engine in order to assist in providing the requisite amount of refrigeration and to recover a portion of the energy originally expended in compressing the air. A portion or all of the nitrogen may, however, be liquefied and delivered to the rectification column. This mode of applying the invention is not, however, considered in detail in the present embodiment, the invention being more particularly directed to the means whereby liquid of the desired composition may be accumulated.

The liquid escaping from the tubes in which it is formed is, for the purpose of the present invention, permitted to fall upon trays where it is subjected in relatively thin layers to the action of the incoming air for the purpose of carrying out a partial rectification by contact of the air therewith and consequent separation of the more volatile constituent, nitrogen, while oxygen from the air is liquefied and remains with the liquid. This liquid in passing over the trays is gradually enriched in oxygen and finally accumulates in a body which approximates a composition in phase equilibrium with the incoming air and contains, therefore, substantially 47 per cent of oxygen, the remainder being nitrogen.

Liquid accumulated in this manner is delivered through a reducing valve to a rectifier where it is subjected to direct contact with vapors arising from the liquid evaporated by the initial condensation of the air. By this means the constituents are separated, the oxygen accumulating in the liquid while nitrogen and a portion of the oxygen is released and the two gases escape as an effluent having a composition in phase equilibrium with the liquid delivered to the rectifier. Since this liquid is materially enriched in oxygen, the liquid which finally accumulates as a result of the rectification will be correspondingly richer in oxygen and the gaseous oxygen produced by evaporation thereof will be of the highest quality and adapted to the most refined uses. The liquid oxygen which accumulates in the apparatus and is there vaporized is delivered in an extremely cold condition, and the pressure at which air enters the cycle may be high enough so that the oxygen is still at a relatively high pressure, although the original pressure is somewhat reduced by the passage of the liquid through the reducing valve. After giving up its cold to the incoming air, the oxygen may, if at a relatively high pressure, be expanded in suitable engines in order to assist in the refrigeration and to recover a portion of the energy which was initially used in compressing the air.

Obviously while the particular feature of rectification to produce a liquid initially rich in oxygen is described herein in connection with numerous details of a method to which it is particularly adapted, it may be employed in connection with other methods requiring the delivery of a liquid mixture to a rectifier.

Referring to the drawing for the more particular features of the invention, 5 indicates a column having a pot 6, a preliminary rectifier 7, a gas chamber 8, a liquid chamber 9 in which a receptacle 10 for liquid is suspended, and a rectifying compartment 11. Cold compressed air is delivered to the pot 6 through a pipe 12 and passes thence through trays 13 upon which the liquid fraction of the compressed air accumulates. The air thence passes through tubes 14 in indirect contact with cold gaseous products of the operation in the chamber 8 and with liquid in the chamber 9 and receptacle 10 which cools the air to such an extent that substantially all of the oxygen and some of the nitrogen are liquefied. The tubes 14 terminate in a head 15 from which the residual gas consisting substantially of nitrogen is delivered through a pipe 21.

During its passage backwardly through the tubes in contact with the air, the liquefied fraction of the air is subjected to autopurification, the air taking up nitrogen from the liquid and supplying oxygen thereto so that the liquid is gradually enriched in oxygen until it is delivered to the trays 13. Here enrichment in oxygen is augmented by the action of the incoming air which drives off a considerable proportion of the remaining nitrogen from the liquid while oxygen from the air is liquefied therefrom and joins the liquid which flows into the pot 6. This liquid accumulating in the pot has a composition which is substantially in phase equilibrium with the incoming air, the proportion of oxygen being substantially 47 per cent, the maximum theoretical composition which is obtainable under the conditions prevailing.

From the pot 6 the liquid is delivered through a pipe 17 and reducing valve 18 to the rectifying compartment 11 where it flows downwardly over trays 19 and is subjected therein to the action of vapors arising from the chamber 9 as a result of vaporization of the liquid by indirect contact with the air within the tubes 14. The more volatile constituent, nitrogen, is thereby vaporized while the liquid becomes more and more enriched in oxygen, being finally delivered through a pipe 20 to the receptacle 10 whence it overflows into the chamber 9. The liquid accumulating in the chamber 9 is substantially pure oxygen and is vaporized and withdrawn through the pipe 16. After giving up its cold to the incoming air, it may be expanded in a suitable engine to recover a portion of the work originally applied in raising the air to its initial pressure. The effluent gas consisting principally of nitrogen with some oxygen necessarily carried over by the inherent disability of the rectification method to separate the oxygen and nitrogen sharply, is delivered through a pipe 22.

To provide for heat interchange between the incoming air and the gas leaving the apparatus, an exchanger is employed comprising a plurality of sections A, B, C and D which are substantially identical in form, being provided with baffles 23 and sets of tubes 24 and 25 which communicate with compartments 26, 27, 28 and 29 for the purpose of conveying the gases in indirect contact with the incoming air circulating about the baffles 23 and around the tubes. The sections of the exchanger are connected by pipes 30, 31 and 32 so that the air entering the exchanger is permitted to pass through the sections successively and is finally delivered through the pipe 12 to the column.

Nitrogen delivered by the pipe 21 from the column enters the compartment 26 of the section D and travels successively through compartments D and C connected by a pipe 33. The nitrogen is withdrawn from the compartment 26 at the end of the section C and a portion thereof is delivered by a pipe 34 having a valve 35 to an engine 36 where the gas is expanded and thereby cooled. The cold expanded product passes thence through a pipe 37 to the chamber 8 of the column where it circulates around the baffles 38 therein and about the tubes 14 for the purposes hereinbefore described. Escaping from the chamber 8 the gas is delivered through a pipe 39 to the compartment 27 at the end of the section D of the exchanger and passes through the tubes 25 of the several sections of the exchanger to the compartment 27 at the end of section A from which it escapes through a pipe 40 controlled by a valve 41.

The remaining nitrogen is conveyed through a pipe 42 to the compartment 26 in section B of the exchanger and passes through the tubes 24 in sections A and B which are connected by a pipe 43. The nitrogen is delivered to the compartment 26 at the end of the section A of the exchanger and is conveyed through a pipe 44 controlled by a valve 45 to an expansion engine 46 where the nitrogen is expanded and thereby cooled. The cooled nitrogen is conveyed from the engine by a pipe 47 and a portion thereof is delivered through a pipe 48 to the compartment 27 of the section B of the exchanger where it joins the previously expanded nitrogen from the engine 36 and is delivered therewith to the outlet 40. Another portion of the nitrogen from the engine 46 is conveyed through a pipe 49 controlled by a valve 50 to an exchanger 51 where it serves in passing through the tubes 52 thereof to cool the incoming air delivered to the exchanger through an intake 53. The nitrogen escapes through an outlet 54.

Oxygen from the column is delivered through the pipe 16 to the compartment 29 at the end of section D of the exchanger and passes thence through tubes 25 in the successive sections and is delivered through a pipe 55 to an outlet 56 controlled by a valve 57. A by-pass 58 controlled by a valve 59 connects the pipe 55 to the pipe 44 so that in starting the apparatus air after compression and passage through the apparatus may be expanded in the engine 46 to produce the necessary refrigerating effect.

The effluent gas from the column passes through the pipe 22 to the compartment 28 at the end of the exchanger and thence travels through tubes 25 in the successive sections to the compartment 28 at the end of the section A of the exchanger. The effluent gas is withdrawn through a pipe 59' controlled by a valve 60 and in the normal operation of the apparatus is conveyed through a pipe 61 controlled by a valve 62 to the inlet pipe 63 of the air compressor 64. The pipe 63 is connected to the exchanger 51 and receives the air cooled therein for conveyance to the compressor. The air is introduced through a pipe 53. By permitting the effluent gas from the column to mix with this incoming air, the temperature of the air may be further reduced before compression with corresponding advantage in the energy required for compression and, moreover, the effluent gas is returned to the cycle so that all of the air initially compressed is eventually separated and the constituents thereof are recovered.

The air or gaseous mixture compressed in the compressor 64 is cooled in an aftercooler 65 and is conveyed through a pipe 66 to the section A of the exchanger. After passing through the several sections in contact with the tubes 24 and 25, the air is delivered as hereinbefore described through the pipe 12 to a pot 6 at the bottom of the column. To assist in accumulating refrigerative effect in commencing the operation, a by-pass 67 connects the pipes 59' and 34 and is controlled by a valve 68. When the valve 68 is open and the valve 62 is closed, the effluent from the top of the column which in starting consists of air passing through the apparatus, is delivered to the engine 36 where it is expanded and cooled.

From the foregoing description, it will be apparent that I have introduced a novel feature with resulting improvement of liquefaction operations as heretofore conducted. By providing for rectification of the liquid initially formed in the apparatus before it is conveyed to the rectifier, the initial composition of this liquid in oxygen, for example, is markedly improved with the result that a closer and more economical separation is possible in the rectifier.

Various changes may be made in the apparatus disclosed without departing from the invention or sacrificing any of the advantages thereof.

I claim:—

1. In an apparatus for separating the constituents of a gaseous mixture by liquefaction and rectification, the combination of a column having a compartment for a body of liquid, tubes traversing the compartment, a head in which the tubes terminate, a chamber beneath said compartment and communicating with the tubes, an inlet for the mixture to the chamber, means therein to effect preliminary rectification of the liquid formed in the tubes by contact with the incoming mixture, a rectifier above said compartment and means for delivering liquid from the chamber to said rectifier.

2. In an apparatus for separating the constituents of a gaseous mixture by liquefaction and rectification, the combination of a column having a compartment for a body of liquid, tubes traversing the compartment, a head in which the tubes terminate, a chamber beneath said compartment and communicating with the tubes, an inlet for the mixture to the chamber, means therein to effect preliminary rectification of the liquid formed in the tubes by contact with the incoming mixture, a rectifier above said compartment, means for delivering liquid from the chamber to said rectifier, means for withdrawing residual unliquefied gas from said head and means for recovering energy from the residual gas.

3. In an apparatus for separating the constituents of a gaseous mixture by liquefaction and rectification, the combination of a column having a compartment for a body of liquid, tubes traversing the compartment, a head in which the tubes terminate, a chamber beneath said compartment and communicating with the tubes, an inlet for the mixture to the chamber, means therein to effect preliminary rectification of the liquid formed in the tubes by contact with the incoming mixture, a rectifier above said compartment, means for delivering liquid from the chamber to said rectifier, means for withdrawing residual unliquefied gas from said head, means for recovering energy from the residual gas, including heat interchangers wherein the residual gas is warmed and one or more engines wherein the gas is expanded.

4. In an apparatus for separating the constituents of a gaseous mixture by liquefaction and rectification, the combination of a column having a compartment for a body of liquid, tubes traversing the compartment, a head in which the tubes terminate, a chamber beneath said compartment and communicating with the tubes, an inlet for the mixture to the chamber, means therein to effect preliminary rectification of the liquid formed in the tubes by contact with the incoming mixture, a rectifier above said compartment, means for delivering liquid from the chamber to said rectifier, and means for withdrawing an effluent gas from the rectifier and returning it to the chamber.

5. In an apparatus for separating the constituents of a gaseous mixture by liquefaction and rectification, the combination of a column having a compartment for a body of liquid, tubes traversing the compartment, a head in which the tubes terminate, a chamber beneath the compartment and communicating with the tubes, means for compressing and cooling the mixture and for delivering it to the chamber, means in the chamber to effect rectification of the liquid formed in the tubes, a rectifier above the compartment, means for delivering liquid from the chamber thereto, and means permitting cooling of the gaseous mixture before it enters the compressing means.

6. In an apparatus for separating the constituents of gaseous mixtures, the combination of means for subjecting the gaseous mixture to selective liquefaction and means for subjecting the liquid thus produced to rectification by contact with the incoming gaseous mixture before the latter is delivered to the selective liquefaction means.

7. In an apparatus for separating the constituents of gaseous mixtures, the combination of means for subjecting the gaseous mixture to selective liquefaction, means for subjecting the liquid thus produced to rectification by contact with the incoming gaseous mixture before the latter is delivered to the selective liquefaction means, and means for subjecting the liquid product of the first rectification to a further rectification in contact with vapors from previously rectified portions thereof.

8. In an apparatus for separating the constituents of gaseous mixtures, the combination of means for subjecting the gaseous mixture to selective liquefaction including a plurality of tubes through which the gaseous mixture is permitted to pass and means below the tubes for subjecting the gaseous mixture first to rectification by contact with the liquid produced in the tubes.

9. In an apparatus for separating the constituents of gaseous mixtures, the combination of means for subjecting the gaseous mixture to selective liquefaction including a plurality of tubes through which the gaseous mixture is permitted to pass, means below the tubes for subjecting the gaseous mixture first to rectification by contact with the liquid produced in the tubes, and means for subjecting the liquid product of the first rectification to further rectification in contact with vapors from previously rectified portions thereof.

10. In an apparatus for separating the constituents of gaseous mixtures, the combination of means for subjecting the gaseous mixture to selective liquefaction, means for subjecting the liquid thus produced to rectification by contact with the incoming gaseous mixture before the latter is delivered to the selective liquefaction means, means for subjecting the liquid product of the first rectification to a further rectification in contact with vapors from previously rectified portions thereof, and means for returning the gaseous effluent from the second rectification for further separation by repetition of the cycle.

In testimony whereof I affix my signature.

CLAUDE C. VAN NUYS.